(12) United States Patent
Xiao et al.

(10) Patent No.: US 11,563,524 B2
(45) Date of Patent: Jan. 24, 2023

(54) WIRELESS COMMUNICATION METHOD AND DEVICE

(71) Applicants: Sharp Kabushiki Kaisha, Sakai (JP); FG Innovation Company Limited, New Territories (HK)

(72) Inventors: Fangying Xiao, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/769,160

(22) PCT Filed: Dec. 7, 2018

(86) PCT No.: PCT/CN2018/119777
§ 371 (c)(1),
(2) Date: Jun. 2, 2020

(87) PCT Pub. No.: WO2019/110003
PCT Pub. Date: Jun. 13, 2019

(65) Prior Publication Data
US 2021/0218501 A1 Jul. 15, 2021

(30) Foreign Application Priority Data

Dec. 7, 2017 (CN) .......................... 201711290005.2

(51) Int. Cl.
*H04L 1/00* (2006.01)
*H04L 1/16* (2006.01)
(Continued)

(52) U.S. Cl.
CPC .......... *H04L 1/1642* (2013.01); *H04L 1/1685* (2013.01); *H04L 1/18* (2013.01); *H04W 28/04* (2013.01)

(58) Field of Classification Search
CPC ....... H04L 1/1642; H04L 1/1685; H04L 1/18; H04L 1/1874; H04L 1/188; H04L 1/16; H04W 28/04
(Continued)

(56) References Cited

U.S. PATENT DOCUMENTS 8,023,454 B2 * 9/2011 Yi .......................... H04L 1/1848
370/335
2009/0119564 A1 * 5/2009 Sagfors ................. H04L 1/1685
714/748

(Continued)

FOREIGN PATENT DOCUMENTS

CN 1788448 A 6/2006

OTHER PUBLICATIONS

3rdGenerationPartnershipProject;TechnicalSpecificationGroupRadioAccessNetwork;NR;RadioLinkControl
RLC)protocolspecification(Release15), 3GPPTS38.322V1.1.0, Oct. 2017, 37pages.*

(Continued)

*Primary Examiner* — Albert Decady
*Assistant Examiner* — Osman M Alshack
(74) *Attorney, Agent, or Firm* — ScienBiziP, P.C.

(57) ABSTRACT

The present disclosure provides a method executed by user equipment, the method including: submitting, by a transmitting side of an Acknowledged Mode Radio Link Control (AM RLC) entity, to a lower layer an Acknowledged Mode data Service Data Unit (AMD PDU) including a poll. The method further includes: updating, by the RLC entity, a poll send state variable to the highest sequence number of an Acknowledged Mode Radio Link Control Service Data Unit (RLC SDU) submitted and awaiting acknowledgments. Furthermore, the present disclosure further provides corresponding user equipment.

3 Claims, 2 Drawing Sheets

(51) Int. Cl.
*H04L 1/18* (2006.01)
*H04W 28/04* (2009.01)

(58) Field of Classification Search
USPC .......................................... 714/726, 748–750
See application file for complete search history.

(56) References Cited

U.S. PATENT DOCUMENTS

| | | | | |
|---|---|---|---|---|
| 2009/0190480 | A1* | 7/2009 | Sammour | H04L 1/1848 370/242 |
| 2010/0177701 | A1* | 7/2010 | Maheshwari | H04L 1/1685 370/328 |
| 2010/0304733 | A1* | 12/2010 | Yi | H04L 1/188 455/422.1 |
| 2011/0019756 | A1* | 1/2011 | Chun | H04L 1/1685 455/509 |
| 2011/0179329 | A1* | 7/2011 | Kim | H04L 1/1825 714/E11.01 |
| 2011/0299681 | A1* | 12/2011 | Kubota | H04W 12/037 380/247 |
| 2013/0194933 | A1* | 8/2013 | Celik | H04L 1/1685 370/242 |
| 2015/0163741 | A1* | 6/2015 | Sheth | H04L 1/188 370/311 |
| 2016/0150433 | A1* | 5/2016 | Bergquist | H04W 24/10 370/328 |
| 2016/0157181 | A1* | 6/2016 | Leicht | H04W 52/0251 455/574 |
| 2016/0219458 | A1* | 7/2016 | Kubota | H04L 1/1896 |
| 2017/0290055 | A1 | 10/2017 | Koskinen | |
| 2018/0310192 | A1* | 10/2018 | Bergquist | H04L 1/188 |
| 2020/0059324 | A1* | 2/2020 | Martin | H04L 1/1874 |

OTHER PUBLICATIONS

Official Communication issued in International Patent Application No. PCT/CN2018/119777, dated Feb. 27, 2019.
Huawei et al., "Way forward for RLC pre-processing", 3GPP TSG-AN WG2 NR #99bis, Oct. 9-13, 2017, R2-1710210, pp. 1-8.
Nokia et al., "Clarifications to the ARQ procedures", 3GPP TSG-RAN WG2 #99bis, R2-1711269, Oct. 9-13, 2017, 7 pages.
NTT DOCOMO, "New SID Proposal: Study on New Radio Access Technology", 3GPP TSG RAN Meeting #71, RP-160671, Mar. 7-10, 2016, 8 pages.

* cited by examiner

WIRELESS COMMUNICATION METHOD AND DEVICE

TECHNICAL FIELD

The present disclosure relates to the field of wireless communications technologies, and specifically, to a method executed by user equipment and corresponding user equipment.

BACKGROUND

A new research project on 5G technical standards (see non-patent literature: RP-160671: New SID Proposal: Study on New Radio Access Technology) was proposed in the 3rd Generation Partnership Project (3GPP) RAN #71 plenary session held in March 2016. The goal of the research project was to develop a New Radio (NR) access technology to meet all of the application scenarios, requirements, and deployment environments of 5G. NR has three main application scenarios: enhanced mobile broadband communications, massive machine type communications, and ultra-reliable and low-latency communications.

It was agreed in the 3GPP RAN2 #96 meeting held in October 2016 that NR Radio Link Control (RLC) entities do not support cascade operations. It was agreed in the RAN2NR Adhoc #2 meeting held in June 2017 that split bearers can adopt data preprocessing similar to that of single carriers. It was agreed in the RAN2 #99 meeting held in August 2017 that NR UE can perform data preprocessing on an uplink split bearer before receiving a lower-layer request (or a data sending request) and deliver data (namely, preprocessed data) to a lower layer before receiving the request from the lower layer. It was agreed in the RAN2 #99bis session held in October 2017 that an RLC entity discards an RLC SDU only when none of segments of the RLC SDU is transmitted over an air interface or mapped to a transmission block or transmitted in a transmission opportunity from a lower-layer notification. It was agreed in the RAN2 #100 meeting that the send state variable TX_Next is used to hold a sequence number to be assigned for the next newly generated AMD PDU, and the initial value thereof is 0; in addition, when an AMD PDU with the sequence number being TX_Next is constructed and the AMD PDU contains an RLC SDU or the last segment of an RLC SDU, TX_Next is updated. The conclusions reached in the previous meetings will affect a processing process of a poll flow at a transmitting side of an AM RLC entity.

SUMMARY

The present disclosure relates to a plurality of issues pertaining to a poll flow at a transmitting side of an AM RLC entity. The issues comprise a processing flow of a transmitting side of an AM RLC entity sending to a lower layer an AMD PDU comprising a poll, state variable updating, description of a poll flow, description of reception of a state report, and retransmission of an RLC SDU.

In order to solve at least a part of the above issues, the present disclosure provides a method executed by user equipment, the method comprising submitting, by a transmitting side of an Acknowledged Mode Radio Link Control (AM RLC) entity, to a lower layer an Acknowledged Mode data Protocol Data Unit (AMD PDU) comprising a poll. The method further comprises updating a poll send state variable POLL_SN to the highest sequence number SN of a Radio Link Control Service Data Unit (RLC SDU) submitted and awaiting acknowledgments.

In an embodiment, if a timer t-PollRetransmit is not running, then start the timer t-PollRetransmit; otherwise, restart the timer t-PollRetransmit, wherein the timer t-PollRetransmit is used by the AM RLC entity in order to retransmit a poll.

In an embodiment, if the timer t-PollRetransmit expires and both a transmission buffer and a retransmission buffer (excluding a transmitted RLC SDU or RLC SDU segment awaiting acknowledgments) are empty, then the transmitted RLC SDU awaiting acknowledgments and having the highest sequence number SN is retransmitted; or, if the timer t-PollRetransmit expires and no new RLC SDU or RLC SDU segment can be transmitted, the transmitted RLC SDU awaiting acknowledgments and having the highest sequence number SN is retransmitted.

In an embodiment, when a state report received from a receiving side of the AM RLC entity comprises a positive acknowledgment or a negative acknowledgment for an RLC SDU having been submitted when the most recent AMD PDU comprising a poll is submitted and awaiting acknowledgments and having the highest sequence number SN, if a timer t-PollRetransmit is running, the timer t-PollRetransmit is stopped and reset.

In an embodiment, the highest sequence number SN satisfies TX_Next_Ack<=SN<=TX_Next, wherein TX_Next_Ack is an acknowledgment state variable, and TX_Next_Ack holds a sequence number of a next RLC SDU for which a positive acknowledgment is to be received in sequence; and TX_Next holds a sequence number to be assigned for the next newly generated AMD PDU.

In an embodiment, the highest sequence number SN satisfies TX_Next_Ack<=SN<TX_Next_Ack+AM_Window_Size, wherein TX_Next_Ack is an acknowledgment state variable, and TX_Next_Ack holds a sequence number of a next RLC SDU for which a positive acknowledgment is to be received in sequence; and AM_Window_Size is a constant used by the transmitting side and the receiving side of the AM RLC entity.

According to another aspect of the present disclosure, user equipment is provided, comprising a processor and a memory. The memory have instructions stored thereon, and the instructions, when run by the processor, cause the user equipment to execute the method executed by user equipment described above.

BRIEF DESCRIPTION OF THE DRAWINGS

The above and other features of the present disclosure will become more apparent with the following detailed description in conjunction with the accompanying drawings.

It should be noted that the drawings are not necessarily drawn to scale, with a focus on illustrating the principles of the techniques disclosed herein. Additionally, for clarity, like reference numerals refer to similar elements throughout the figures.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are introduced first. If not specifically indicated, the terms involved in the present disclosure use the definitions herein.

PDCP: Packet Data Convergence Protocol.

RLC: Radio Link Control. An RLC entity may be an Unacknowledged Mode (UM) RLC entity or an Acknowledged Mode (AM) RLC entity.

In an AM RLC entity, an RLC header is added to an RLC SDU or an RLC SDU segment to acquire an AM data PDU (AMD PDU). In a UM RLC entity, an RLC header is added to an RLC SDU or an RLC SDU segment to acquire a UM data PDU (UMD PDU). An RLC data PDU may be an AMD PDU or a UMD PDU, but does not contain an RLC control PDU.

MAC: Medium Access Control.

PDU: Protocol Data Unit.

SDU: Service Data Unit.

Segment: Part of an RLC SDU.

In the present disclosure, data received from or delivered to an upper layer is referred to as an SDU, and data submitted to or received from a lower layer is referred to as a PDU. For example, data received from or delivered to an upper layer by an RLC entity is referred to as an RLC SDU; data received from or submitted to a MAC entity by an RLC entity is referred to as an RLC PDU.

Figure 1:
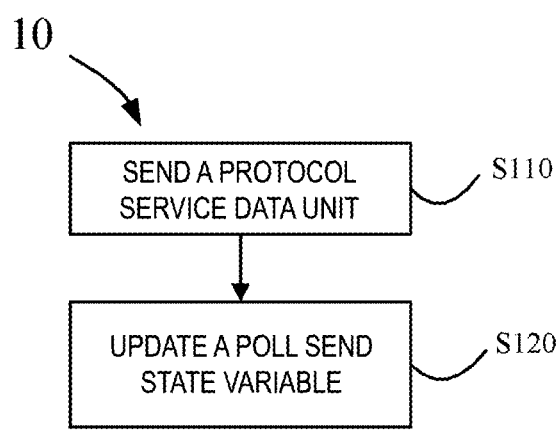
FIG. 1 is a flowchart of a method executed by user equipment according to an embodiment of the present disclosure.

FIG. 1 is a flowchart of a method 10 executed by User Equipment (UE) according to an embodiment of the present disclosure.

As shown in FIG. 1, in step S110: an Acknowledged Mode Radio Link Control (AM RLC) entity submits to a lower layer an Acknowledged Mode data Protocol Data Unit (AMD PDU), the AMD PDU including a poll or a poll bit being set to "1." That is, an Acknowledged Mode Radio Link Control (AM RLC) entity submits to a lower layer an Acknowledged Mode data Protocol Data Unit (AMD PDU) including a poll. Optionally, if necessary, a send state variable TX_Next is updated. The send state variable TX_Next holds a sequence number to be assigned for the next newly generated AMD PDU. TX_Next is initially set to 0, and TX_Next is updated whenever the AM RLC entity constructs an AMD PDU with the sequence number SN=TX_Next and contains an RLC SDU or the last segment of an RLC SDU.

Optionally, if necessary, the send state variable TX_Next is updated. The send state variable TX_Next holds a sequence number to be assigned for the next newly generated AMD PDU. TX_Next is initially set to 0, and TX_Next is updated whenever the AM RLC entity sends or transmits, or sends or transmits to the lower layer, an AMD PDU with the sequence number SN=TX_Next and contains an RLC SDU or the last segment (or the first segment) of an RLC SDU.

In step S120, the AM RLC entity updates the value of a poll send state variable POLL_SN. The poll send state variable POLL_SN can be used to hold the highest sequence number SN of an RLC SDU or AMD PDU having been submitted when the most recent transmission of an AMD PDU including a poll is submitted. Alternatively, the poll send state variable POLL_SN can be used to hold the highest sequence number SN of an RLC SDU or AMD PDU having been submitted when the most recent transmission of an AMD PDU including a poll is submitted and awaiting acknowledgments. Alternatively, the poll send state variable POLL_SN can be used to hold the highest sequence number SN of an RLC SDU or AMD PDU in a retransmission buffer when the most recent transmission of an AMD PDU including a poll is submitted. Alternatively, the poll send state variable POLL_SN can be used to hold the highest sequence number SN of an RLC SDU or AMD PDU awaiting acknowledgments in a retransmission buffer when the most recent transmission of an AMD PDU including a poll is submitted. Alternatively, the poll send state variable POLL_SN can be used to hold the value of TX_Next−1 (or TX_Next) when the most recent transmission of an AMD PDU including a poll is submitted.

It should be noted that the "RLC SDU or AMD PDU submitted" or "RLC SDU or AMD PDU submitted and awaiting acknowledgments" or "RLC SDU or AMD PDU in a retransmission buffer" or "RLC SDU or AMD PDU awaiting acknowledgments in a retransmission buffer" includes the most recently submitted AMD PDU including a poll. POLL_SN is initially set to 0. "The highest sequence number SN of a RLC SDU or AMD PDU submitted" or "the highest sequence number SN of a RLC SDU or AMD PDU submitted and awaiting acknowledgments" or "the highest sequence number SN of an RLC SDU or AMD PDU in a retransmission buffer" or "the highest sequence number SN of an RLC SDU or AMD PDU awaiting acknowledgments in a retransmission buffer" refers to "the highest sequence number among sequence numbers of submitted RLC SDUs or AMD PDUs" or "the highest sequence number among sequence numbers of submitted RLC SDUs or AMD PDUs awaiting acknowledgments" or "the highest sequence number among sequence numbers of RLC SDUs or AMD PDUs in a retransmission buffer" or "the highest sequence number among sequence numbers of RLC SDUs or AMD PDUs awaiting acknowledgments in a retransmission buffer."

It should be noted that the terms "including a poll" and "a poll bit being set to 1" in the embodiment of the present disclosure are interchangeable.

How to update the value of the poll send state variable POLL_SN is described below through specific embodiments.

In an embodiment, after a current AMD PDU including a poll is stored in a retransmission buffer (this operation is performed only if necessary), a transmitting side of the AM RLC entity sets POLL_SN to the highest sequence number SN of an RLC SDU or AMD PDU in the retransmission buffer or the highest sequence number SN of an RLC SDU or AMD PDU awaiting acknowledgments in the retransmission buffer. The sequence number SN satisfies $TX\_Next\_Ack <= SN <= TX\_Next$ or $TX\_Next\_Ack <= SN < TX\_Next\_Ack + AM\_Window\_Size$.

Optionally, POLL_SN is set to the highest sequence number SN of an RLC SDU or AMD PDU including a poll in the retransmission buffer or the highest sequence number SN of an RLC SDU or AMD PDU including a poll and awaiting acknowledgments in the retransmission buffer.

In an embodiment, a transmitting side of the AM RLC entity sets POLL_SN to the highest sequence number SN of an RLC SDU or AMD PDU (containing a currently submitted AMD PDU including a poll) in a retransmission buffer or the highest sequence number SN of an RLC SDU or AMD PDU (containing a currently submitted AMD PDU including a poll) awaiting acknowledgments in the retransmission buffer. The sequence number SN satisfies $TX\_Next\_Ack <= SN <= TX\_Next$ or $TX\_Next\_Ack <= SN < TX\_Next\_Ack + AM\_Window\_Size$.

Optionally, POLL_SN is set to the highest sequence number SN of an RLC SDU or AMD PDU including a poll in the retransmission buffer or the highest sequence number SN of an RLC SDU or AMD PDU including a poll and awaiting acknowledgments in the retransmission buffer.

In an embodiment, a transmitting side of the AM RLC entity sets POLL_SN to the larger sequence number SN between a sequence number of a currently submitted AMD PDU including a poll and the highest sequence number of an RLC SDU or AMD PDU in a retransmission buffer. The sequence number SN satisfies TX_Next_Ack<=SN<=TX_Next or TX_Next_Ack<=SN<TX_Next_Ack+AM_Window_Size. Optionally, POLL_SN is set to the larger sequence number SN between a sequence number of a currently submitted AMD PDU including a poll and the highest sequence number of an RLC SDU or AMD PDU including a poll in the retransmission buffer.

In an embodiment, a transmitting side of the AM RLC entity sets POLL_SN to the highest sequence number SN of a RLC SDU or AMD PDU submitted to lower layer and awaiting acknowledgments. The sequence number SN satisfies TX_Next_Ack<=SN<=TX_Next or TX_Next_Ack<=SN<TX_Next_Ack+AM_Window_Size. Optionally, POLL_SN is set to the highest sequence number SN of a RLC SDU or AMD PDU submitted and awaiting acknowledgments and including a poll.

In an embodiment, a transmitting side of the AM RLC entity sets POLL_SN to the highest sequence number SN of a RLC SDU or AMD PDU (containing a currently submitted AMD PDU including a poll) submitted and awaiting acknowledgments. The sequence number SN satisfies TX_Next_Ack<=SN<=TX_Next or TX_Next_Ack<=SN<TX_Next_Ack+AM_Window_Size. Optionally, POLL_SN is set to the highest sequence number SN of a RLC SDU or AMD PDU (containing a currently submitted AMD PDU including a poll) submitted and awaiting acknowledgments and including a poll.

In an embodiment, a transmitting side of the AM RLC entity sets POLL_SN to the larger sequence number SN between a sequence number of a currently submitted AMD PDU including a poll and the highest sequence number of a RLC SDU or AMD PDU submitted and awaiting acknowledgments. The sequence number SN satisfies TX_Next_Ack<=SN<=TX_Next or TX_Next_Ack<=SN<TX_Next_Ack+AM_Window_Size. Optionally, POLL_SN is set to the larger sequence number SN between a sequence number of a currently submitted AMD PDU including a poll and the highest sequence number of a RLC SDU or AMD PDU submitted and awaiting acknowledgments and including a poll.

In an embodiment, a transmitting side of the AM RLC entity sets POLL_SN to TX_Next−1 (or TX_Next).

It should be noted that in the embodiment of the present disclosure, TX_Next_Ack is an acknowledgment state variable, and the variable holds the sequence number of a next RLC SDU for which a positive acknowledgment is to be received in sequence, and the sequence number is a lower limit of a sending window. TX_Next_Ack is initially set to 0, and is updated whenever the AM RLC entity receives a positive acknowledgment for an RLC SDU with the sequence number SN=TX_Next_Ack. AM_Window_Size is a constant used by the transmitting side and a receiving side of the AM RLC entity. When the sequence number uses 12 bits, AM_Window_Size=2048; when the sequence number uses 18 bits, AM_Window_Size=131072.

It should be noted that "RLC SDU or AMD PDU awaiting acknowledgments" in the embodiment of the present disclosure is equivalent to "RLC SDU or AMD PDU for which a positive acknowledgment has not been received."

Optionally, after the AM RLC entity submits to the lower layer an AMD PDU including a poll and/or the poll send state variable POLL_SN is updated, if a timer t-PollRetransmit is not running, then start the timer t-PollRetransmit; otherwise, restart the timer t-PollRetransmit.

In the embodiment of the present disclosure, the timer t-PollRetransmit is used by the AM RLC entity in order to retransmit a poll (the timer t-PollRetransmit is used by the transmitting side of the AM RLC entity in order to retransmit a poll).

The following describes an embodiment of operation to be performed by the transmitting side of the AM RLC entity when the timer t-PollRetransmit expires after the AM RLC entity submits to the lower layer an AMD PDU including a poll and/or the poll send state variable POLL_SN is updated and the timer t-PollRetransmit is started.

If the timer t-PollRetransmit expires, the transmitting side of the AM RLC entity performs the following operation:
if both a transmission buffer and a retransmission buffer (excluding a transmitted RLC SDU or RLC SDU segment awaiting acknowledgments) are empty, or no new RLC SDU or RLC SDU segment can be transmitted (for example, due to window stalling), then an RLC SDU is selected for retransmission. Both a transmission buffer and a retransmission buffer being empty refers to that the transmission buffer and/or the retransmission buffer does not have other RLC SDUs or RLC SDU segments except a transmitted RLC SDU or RLC SDU segment awaiting acknowledgments.

How the transmitting side of the AM RLC entity selects an RLC SDU for retransmission is described in detail in the following embodiments.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then a transmitted RLC SDU or AMD PDU awaiting acknowledgments and with the highest sequence number SN is retransmitted. The sequence number SN satisfies TX_Next_Ack<=SN<=TX_Next or TX_Next_Ack<=SN<TX_Next_Ack+AM_Window_Size.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then an RLC SDU or AMD PDU with (or associated with) the highest sequence number SN in the retransmission buffer is retransmitted. The sequence number SN satisfies TX_Next_Ack<=SN<=TX_Next or TX_Next_Ack<=SN<TX_Next_Ack+AM_Window_Size.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then an RLC SDU or AMD PDU submitted to the lower layer and awaiting acknowledgments and with (or associated with) the highest sequence number SN is retransmitted. The sequence number SN satisfies TX_Next_Ack<=SN<=TX_Next or TX_Next_Ack<=SN<TX_Next_Ack+AM_Window_Size.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then an RLC SDU or AMD PDU having been transmitted in a transmission opportunity indicated by the lower layer and awaiting acknowledgments and with (or associated with) the highest sequence number SN is retransmitted. The sequence number SN satisfies TX_Next_Ack<=SN<=TX_Next or TX_Next_Ack<=SN<TX_Next_Ack+AM_Window_Size.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then an RLC SDU or AMD PDU having not been positively acknowledged (or for which a positive acknowledgment has not been received) and with (or associated with) the highest sequence number SN is retransmitted. The sequence number SN satisfies TX_Next_Ack<=SN<=TX_Next or TX_Next_Ack<=SN<TX_Next_Ack+AM_Window_Size.

In an embodiment, if both the transmission buffer and the retransmission buffer (excluding a transmitted RLC SDU or RLC SDU segment awaiting acknowledgments) are empty, or no new RLC SDU or RLC SDU segment can be transmitted (for example, due to window stalling), then an RLC SDU with the sequence number being TX_Next−1 (or TX_Next) is retransmitted.

The Following Describes Embodiments of Operation Performed by the Transmitting Side of the AM RLC Entity when the User Equipment (UE) Receives a State Report.

In an embodiment, when the transmitting side of the AM RLC entity receives a state report from the receiving side of the AM RLC entity, if the state report contains a positive acknowledgment or a negative acknowledgment for an RLC SDU or AMD PDU having been submitted when the most recent AMD PDU including a poll is submitted and awaiting acknowledgments and having the highest sequence number SN, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU having been submitted when the most recent AMD PDU including a poll is submitted and having the highest sequence number SN, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU (containing the AMD PDU including a poll) having been submitted when the most recent AMD PDU including a poll is submitted and having the highest sequence number SN, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU having the highest sequence number SN in the retransmission buffer when the most recent transmission of an AMD PDU including a poll is submitted, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU (containing the AMD PDU including a poll) having the highest sequence number SN in the retransmission buffer when the most recent AMD PDU including a poll is submitted, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU (containing the AMD PDU including a poll) having been submitted to the lower layer (or having been submitted or having been transmitted in a transmission opportunity indicated by the lower layer) when the most recent AMD PDU including a poll is submitted and having the highest sequence number SN, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

In an embodiment, when the transmitting side of the AM RLC entity receives a state report from the receiving side of the AM RLC entity, if the state report contains a positive acknowledgment or a negative acknowledgment for an RLC SDU or AMD PDU (containing the AMD PDU including a poll) having been submitted to the lower layer (or having been submitted or having been transmitted in a transmission opportunity indicated by the lower layer) when the most recent AMD PDU including a poll is submitted and awaiting acknowledgments and having the highest sequence number SN, and the timer t-PollRetransmit is running, then the transmitting side of the AM RLC entity stops and resets the timer t-PollRetransmit. The sequence number SN satisfies TX_Next_Ack<=SN<=TX_Next or TX_Next_Ack<=SN<TX_Next_Ack+AM_Window_Size.

The Following Describes Embodiments of a Poll Process Based on the Send State Variable TX_Send.

In an embodiment, after submitting to the lower layer an AMD PDU including a poll, the transmitting side of the AM RLC entity updates the send state variable TX_Send to the highest sequence number SN of an RLC SDU or AMD PDU (containing a current AMD PDU including a poll and an RLC SDU corresponding thereto) in the current retransmission buffer, or updates the send state variable TX_Send to the highest sequence number SN of an RLC SDU or AMD PDU (containing a current AMD PDU including a poll and an RLC SDU corresponding thereto) having been submitted (or having been submitted to the lower layer or having been transmitted in a transmission opportunity indicated by the lower layer) and awaiting acknowledgments. Then, the value of POLL_SN is set to the current value of TX_Send. Optionally, if the timer t-PollRetransmit is not running, then restart the timer t-PollRetransmit. The timer t-PollRetransmit is used by the transmitting side of the AM RLC entity in order to retransmit a poll. The send state variable TX_Send holds a sequence number of an AMD PDU or RLC SDU submitted to the lower layer or newly submitted. An initial value of the send state variable may be 0. When the transmitting side of the AM RLC entity submits to the lower layer an AMD PDU including a poll, TX_Send is updated to the highest sequence number SN of an RLC SDU or AMD PDU (containing a current AMD PDU including a poll and an RLC SDU corresponding thereto) in the current retransmission buffer, or the send state variable TX_Send is updated to the highest sequence number SN of an RLC SDU or AMD PDU (containing a current AMD PDU including a poll and an RLC SDU corresponding thereto) having been submitted (or having been submitted to the lower layer or having been transmitted in a transmission opportunity indicated by the lower layer) and awaiting acknowledgments.

In an embodiment, the Acknowledged Mode Radio Link Control (AM RLC) entity submits to the lower layer an Acknowledged Mode data Protocol Data Unit (AMD PDU) or a new Acknowledged Mode data Protocol Data Unit (AMD PDU). The AMD PDU contains at least one segment of an RLC SDU. For example, the AMD PDU may contain an RLC SDU (or a complete RLC SDU) or the first segment or the first byte of an RLC SDU, and the RLC SDU or the first segment or the first byte of the RLC SDU is not transmitted or is not retransmitted or does not contain a transmitted byte or segment. The RLC entity updates the send state variable TX_Send to the sequence number of the AMD PDU submitted to the lower layer or the sequence number of the RLC SDU contained in (or corresponding to) the AMD PDU. After the AMD PDU including a poll is submitted to the lower layer and/or TX_Send is updated (TX_Send is updated only when necessary), the transmitting side of the AM RLC entity sets the poll send state variable POLL_SN to TX_Send (or TX_Send−1). In this embodiment, the poll send state variable POLL_SN holds the value of TX_Send (or TX_Send−1) when the most recent transmission of an AMD PDU including a poll is submitted. An initial value of POLL_SN is 0. If the timer t-PollRetransmit is not running, then start the timer t-PollRetransmit. When the timer t-PollRetransmit expires, the AM RLC entity on the transmitting side performs the following operation: if both the sending buffer and the retransmission buffer are empty (excluding an AMD PDU submitted and awaiting acknowledgments), or no new AMD PDU can be submitted (for example, due to window stalling), then the RLC SDU with the sequence number being TX_Send is used for retransmission, or any RLC SDU for which a positive acknowledgment is not received is used for retransmission.

In the present disclosure, calculation of the state variable may be performed in the following manner: if the sequence number is represented by, for example, 12 bits, a value range of the sequence number is 0 to 4095. Then, the value of the state variable equals a remainder of the calculated value modulo 4096. Furthermore, if the sequence number is represented by 18 bits, the value range of the state variable is 0 to 262143. Then, the value of the state variable equals a remainder of the calculated value modulo 262144.

Furthermore, the setting the state variable to the sequence number or the value of the sequence number in the present disclosure means setting the value of the state variable to the sequence number or the value of the sequence number.

It should be noted that in the present disclosure, the terms "AM RLC sending entity" and "the transmitting side of the AM RLC entity" are interchangeable, and the terms "the first segment of the RLC SDU" and "the first byte of the RLC SDU" are interchangeable. In the present disclosure, the terms "transmitted" and "submitted" are interchangeable.

Figure 2:
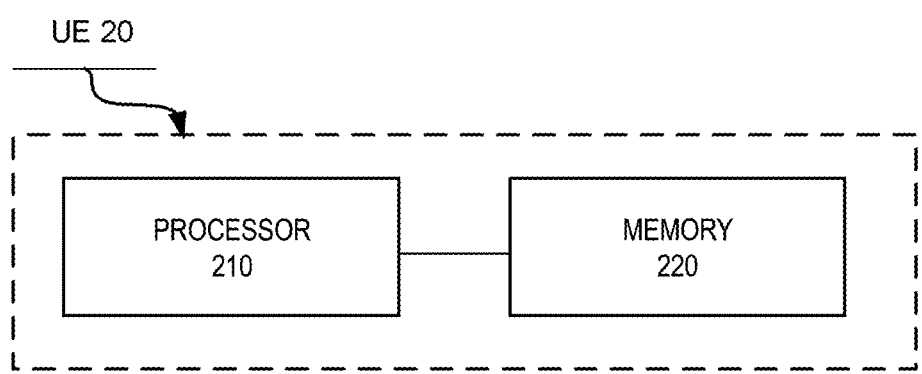
FIG. 2 is a block diagram of user equipment according to an embodiment of the present disclosure.

FIG. 2 is a block diagram of user equipment 20 according to an embodiment of the present disclosure. As shown in FIG. 2, the user equipment 20 includes a processor 210 and a memory 220. The processor 210 may include, for example, a microprocessor, a microcontroller, an embedded processor, or the like. The memory 220 may include, for example, a volatile memory (for example, a random access memory (RAM)), a hard disk drive (HDD), a non-volatile memory (for example, a flash memory), or other memories. Program instructions are stored on the memory 220. The instructions, when run by the processor 210, can execute the aforementioned method executed by user equipment (for example, the method shown in FIG. 1) described in detail in the present disclosure.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by causing a computer system to read programs recorded on the recording medium and execute the programs. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the above embodiments may be replaced with one another.

The invention claimed is:

1. A method executed by a transmitting side of an Acknowledged Mode Radio Link Control (AM RLC) entity of a user equipment, the method comprising:
    submitting, to a lower layer, an Acknowledged Mode Data Protocol Data Unit (AMD PDU) including a poll;
    upon submitting the AMD PDU to the lower layer, setting a Poll send state variable POLL_Sequence Number (SN) to a highest sequence number of the AMD PDU among AMD PDUs that have been submitted to the lower layer;
    starting a timer t-PollRetransmit if the timer t-PollRetransmit is not running after the Poll send state variable POLL_SN is set to the highest sequence number;
    restarting the timer t-PollRetransmit if the timer t-PollRetransmit is running after the Poll send state variable POLL_SN is set to the highest sequence number; and
    upon expiry of the timer t-PollRetransmit, retransmitting a Radio Link Control Service Data Unit (RLC SDU) with a highest sequence number among RLC SDUs that have been submitted to the lower layer for retransmission, wherein:
    the Poll send state variable POLL_SN holds a highest sequence number of the AMD PDU among the AMD PDUs that have been submitted to the lower layer,
    the RLC SDU is retransmitted based on a determination that both a transmission buffer and a retransmission buffer are empty excluding a transmitted RLC SDU or RLC SDU segment awaiting acknowledgement, and
    the RLC SDU is retransmitted further based on a determination that no new RLC SDU or RLC SDU segment is transmitted.

2. The method according to claim 1, wherein the determination that no new RLC SDU or RLC SDU segment is transmitted is made due to window stalling.

3. A User Equipment (UE), comprising:
    at least one processor; and
    a memory having instructions stored thereon, wherein the instructions, when executed by the processor, cause a transmitting side of an Acknowledged Mode Radio Link Control (AM RLC) entity of the UE to:
    submit, to a lower layer, an Acknowledged Mode Data Protocol Data Unit (AMD PDU) including a poll;
    upon submitting the AMD PDU to the lower layer, set a Poll send state variable POLL Sequence Number (SN) to a highest sequence number of the AMD PDU among AMD PDUs that have been submitted to the lower layer;
    start a timer t-PollRetransmit if the timer t-PollRetransmit is not running after the Poll send state variable POLL_SN is set to the highest sequence number;
    restart the timer t-PollRetransmit if the timer t-PollRetransmit is running after the Poll send state variable POLL_SN is set to the highest sequence number; and
    upon expiry of the timer t-PollRetransmit, retransmit a Radio Link Control Service Data Unit (RLC SDU) with a highest sequence number among RLC SDUs that have been submitted to the lower layer for retransmission, wherein:
    the Poll send state variable POLL_SN holds a highest sequence number of the AMD PDU among the AMD PDUs that have been submitted to the lower layer,
    the RLC SDU is retransmitted based on a determination that both a transmission buffer and a retransmission buffer are empty excluding a transmitted RLC SDU or RLC SDU segment awaiting acknowledgement, and
    the RLC SDU is retransmitted further based on a determination that no new RLC SDU or RLC SDU segment is transmitted.

* * * * *